United States Patent
Layne

[15] 3,662,660
[45] May 16, 1972

[54] APPARATUS FOR PROCESSING SENSITIZED MATERIAL

[72] Inventor: Ronald P. Layne, 15598 Addison, Southfield, Mich. 48675

[22] Filed: Aug. 5, 1970

[21] Appl. No.: 61,181

Related U.S. Application Data

[63] Continuation-in-part of Ser. No. 727,821, May 9, 1968, abandoned.

[52] U.S. Cl. ...........................................................95/89 R
[51] Int. Cl. ......................................................G03d 3/06
[58] Field of Search......................95/89 R, 89 A, 89 L, 94 R; 118/637

[56] References Cited

UNITED STATES PATENTS

| | | | |
|---|---|---|---|
| 3,372,630 | 3/1968 | Schmidt | 95/94 |
| 3,392,707 | 7/1968 | Marx | 95/89 X |
| 3,245,334 | 4/1966 | Long | 95/89 |
| 3,308,737 | 3/1967 | Fukuda | 95/89 |
| 3,344,729 | 10/1967 | Kitrosser | 95/89 |
| 3,168,021 | 2/1965 | Levene | 118/637 X |
| 3,516,345 | 6/1970 | Meyer | 95/89 |
| 3,477,356 | 11/1969 | Ray et al. | 95/89 X |

*Primary Examiner*—Samuel S. Matthews
*Assistant Examiner*—Fred L. Braun
*Attorney*—Theodore B. Roessel

[57] ABSTRACT

Apparatus for processing sensitized material such as X-ray film and the like which automatically transports the film through successive processing stages such as developing, fixing, washing and drying. No external connection to water sources or drains are required. The film is oriented in a vertical plane as it passes through the processing stages and the chemical solutions flow downwardly by gravity between wetted surfaces with the surfaces acting to confine the downwardly moving stream so that seals at the film inlet and outlet of the apparatus are not required. The film is passed through the downwardly moving stream of chemical solution which assures constant supply of fresh solution and continuous drainage of the by-products of the chemical reaction.

15 Claims, 9 Drawing Figures

INVENTOR.
RONALD LAYNE
BY
Theodore B Roessel
ATTORNEY

INVENTOR.
RONALD LAYNE
BY Theodore B Roessel
ATTORNEY

APPARATUS FOR PROCESSING SENSITIZED MATERIAL

CROSS REFERENCES TO RELATED APPLICATIONS

This application is a continuation-in-part of a copending application, Ser. No. 727,821, filed May 9, 1968, now abandoned.

BACKGROUND OF THE INVENTION

The present invention relates generally to a method and apparatus for processing sensitized material such as X-ray film and the like and, more specifically, to a method and apparatus wherein the sensitized material is vertically oriented and transported through a downwardly flowing stream of fluid for processing.

While the present invention may be used for processing any type of sensitized material to develop latent images thereon, the invention will be described, for purposes of illustration only, as if the sensitized material were X-ray film.

Previously available roller transport type automatic film processors have serious disadvantages. In such units, the transporting rollers, as a rule, have been oriented horizontally, so that the film negotiates a serpentine path down into and up out of the successive baths of chemical solutions. This arrangement causes those rollers which are submerged to become caked with sludge formed from the by-product of the chemical reactions while those rollers which are exposed to air are subjected to a crystallized coating. In either case, these rollers must be frequently, even daily, removed for cleaning to maintain proper operation of the device. Prior devices also require a source of temperature controlled running water and a drain for use in washing the film and controlling solution temperatures.

Attempts have been made to overcome the problems inherent in apparatus with horizontally oriented rollers by designing equipment which orients the film vertically for passage through a succession of series connected processing chambers, each filled with an appropriate processing solution. However, such attempts have not met with a high degree of success in that it is difficult to seal the film entrance and exit of each stage in order to prevent leakage of the solution from the processing chambers.

Because of the maintenance problems of the equipment employing horizontal rollers and the design problems and high cost of equipment which orients the film vertically during processing, these automatic processors have never achieved any degree of acceptance in the dental field, for example, where dental X-ray film must be processed quickly in a dentist's office with a minimum of supervision and maintenance in order to be economical.

Similarly, there are many disadvantages inherent in the manual processing of dental X-ray films. Such an operation requires the use of a dark room, timer, adjacent source of running water with a drain and a series of tanks and film hangers. The film must be manually placed in each of the chemical baths and the whole operation, including drying, takes as much as 40 minutes. If the dentist wants a quicker reading, he must read the films while wet thus introducing possible inaccuracies in his diagnosis.

OBJECTS OF THE INVENTION

Accordingly, it is the principal object of this invention to provide an improved automatic continuous method and apparatus for processing any sensitized material which is especially useful for applications such as the development of dental X-ray films.

Another object of this invention is to produce an extremely compact self-contained processing apparatus which eliminates the need for a dark room or for water supply or drain connections and which permits fully developed and dryed films to be processed with a minimum time by unskilled help without supervision and with the virtual elimination of daily cleaning or other maintenance of the apparatus.

A further object of this invention is to provide processing apparatus which orients the sensitized material vertically during processing and passes the sensitized material through chambers filled with the processing fluids wherein the need for seals at the film entrance and exit of the chamber is eliminated.

Yet another object of the present invention is to provide a method and apparatus for processing sensitized material wherein the material being processed is transported through a downwardly flowing stream of fluid.

SUMMARY OF THE INVENTION

The present invention may be characterized in one aspect thereof by the provision of a plurality of series connected chambers through which the sensitized material is passed for processing, each chamber having an entrance and an exit for the sensitized material; a plurality of upright members arranged in the chambers along the path of travel of the sensitized material, each upright member having a wettable surface; means for introducing an appropriate fluid into each chamber adjacent the top thereof so that the fluid flows by gravity between the wettable surfaces, the surfaces being so spaced that the fluid contacts and wets each surface and spans the space therebetween so that the fluid is confined by such wetting action to a stream flowing between the wetted surfaces; means adjacent the bottom of the chamber for draining fluid therefrom; and transport means for driving the sensitized material between the wetted surfaces and through the downwardly moving stream of fluid.

DETAILED DESCRIPTION OF THE INVENTION

Figure 1:
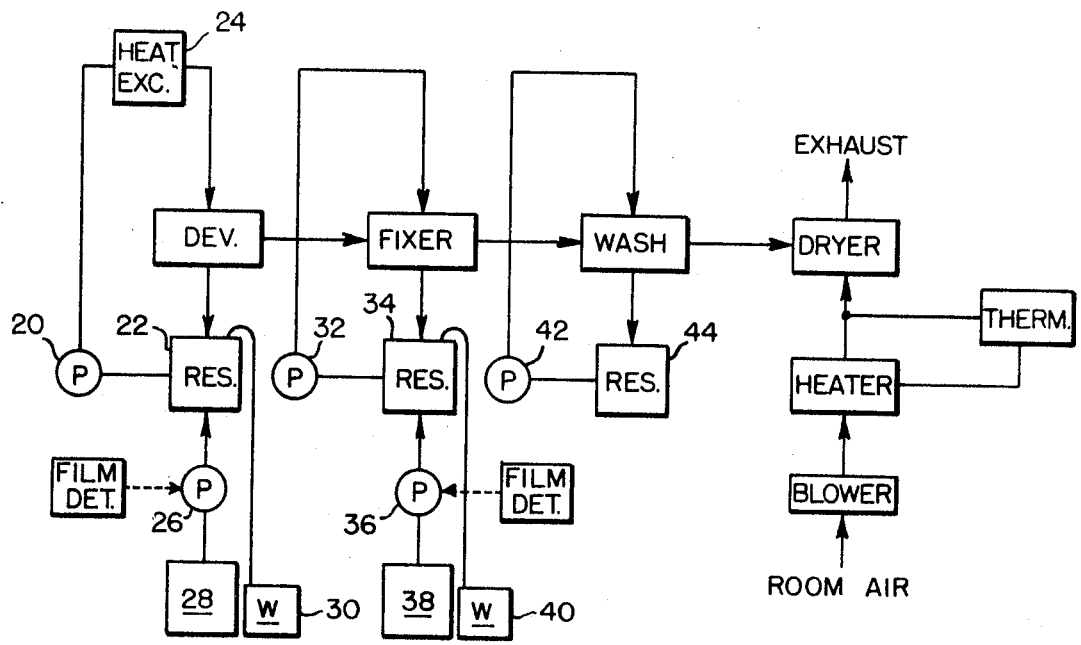
FIG. 1 is a schematic block flow-type diagram showing the general operation of the entire apparatus.

Referring to FIG. 1, there is shown a block flow-type diagram illustrating four modules; namely, a developer, fixer, washer and dryer. These modules correspond respectively to the conventional stages of developing any type of film. However, it should be appreciated that the invention is not limited to conventional developing techniques but that the method and apparatus described herein are also applicable to the processing of any sensitized material or the developing of films by non-conventional techniques such as the use of monobaths and stabilizers and that the present invention will be described with respect to these conventional stages for purposes of illustration only.

The developer and fixer stages as shown in FIG. 1 use conventional chemical solutions while the washer stage uses water and the dryer stage uses heated air. These stages, which can be constructed in modular form together with the various pumps and reservoirs associated with each module are preferably fully enclosed within the cabinet of the apparatus (not shown). There is preferably no connection of this cabinet to any water supply or drain and the supply and removal of fluids from the cabinet are accomplished in a manner set out hereinbelow.

As shown in the flow diagram of FIG. 1, a developer solution is continuously circulated through the developer stage during operation. The circulation is accomplished by any suitable pump 20 which pumps the solution from a reservoir 22 through an appropriate heat exchanger 24 to the developer module and back to the reservoir. The heat exchanger is provided for controlling the temperature of the developer solution and can either heat or cool the solution as necessary for proper developing.

The developer stage also includes a replenishing pump 26 which periodically supplies a measured quantity of fresh developer solution to the reservoir from a replenishing tank 28. Preferably, a measured quantity of fresh developer solution is introduced into the reservoir each time a film passes through the processing stages or is inserted into the developer module. This may be accomplished by a film detector which starts pump 26. The measurement of the quantity of fresh developer solution supplied to the reservoir may be controlled by any suitable means such as by having pump 26 a positive displacement pump. Any overflow from reservoir 22 caused by the introduction of fresh developer solution is delivered to a waste collecting tank 30. The waste tank is preferably removable from the cabinet so that the tank may be emptied. Any suitable level indicator (not shown) may be used to signal the operator when the tank is full or the operator may merely empty the tank periodically such as daily or weekly. In like respect, replenishing tank 28 may be removable from the cabinet of the processor so that it may be refilled or replaced.

The fixer stage is similar to the developer stage in that it includes a pump 32 which continuously recirculates fixer solution through the fixer module when the device is in operation. The fixer solution is contained in a reservoir 34 and a replenisher pump 36 periodically pumps a measured quantity of the fixer solution from replenishing tank 38. Operation of replenishing pump 36 may also be initiated by a film detector and the replenishing tank 38 and waste tank 40 may be removable from the cabinet of the processor as may the replenishing tank 28 and waste tank 30 of the developer stage.

In the washing stage the washing fluid, usually water, is continuously recirculated through the washer module by a pump 42. The water reservoir 44 may be filled by any simple means such as by removing the reservoir from the cabinet or by pouring water into the reservoir at periodic intervals.

The dryer stage includes a heater, a blower and a thermostat for controlling the temperature of the heater. The dryer merely forces air at room temperature through the thermostatically controlled heater and then through the dryer module to remove moisture from and dry the film passing through the dryer stage.

Figures 2, 3, 8:
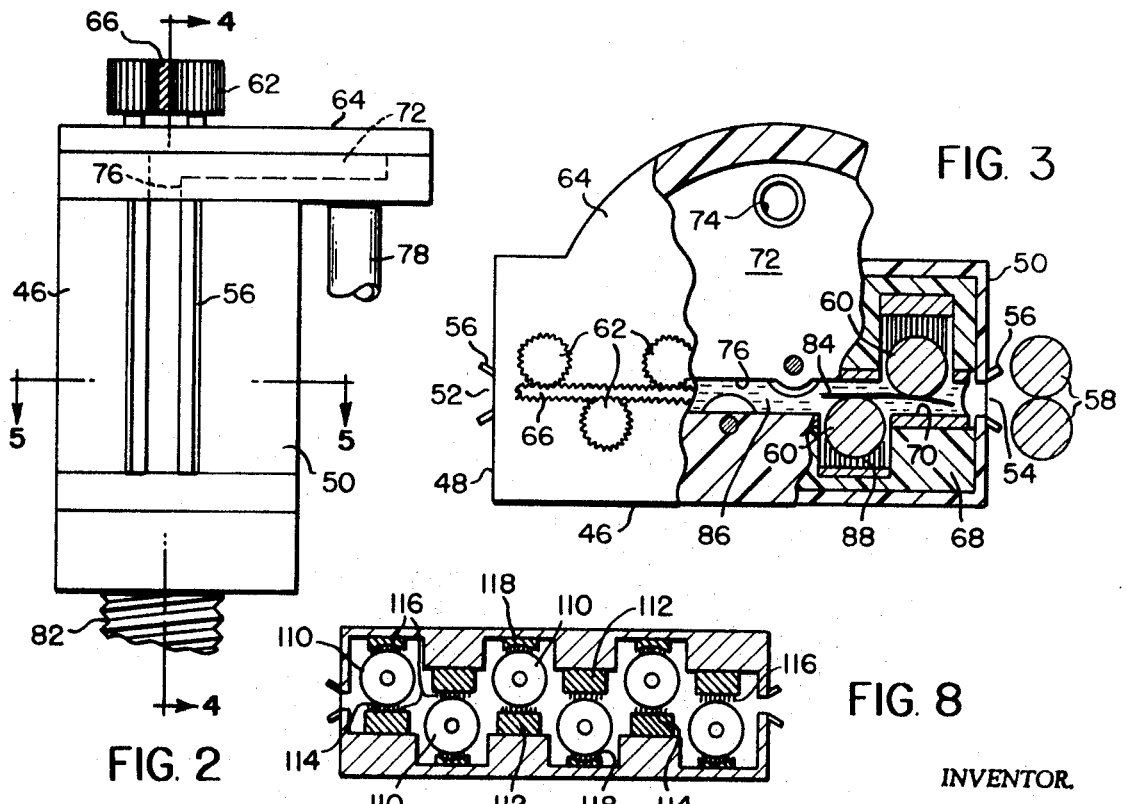
FIG. 2 is a side elevation view of a typical module used in the apparatus.
FIG. 3 is a plan view of a typical module partly broken away and in section to show internal structure.
FIGS. 6–8 are views similar to FIG. 5 showing other embodiments.
Figure 4:
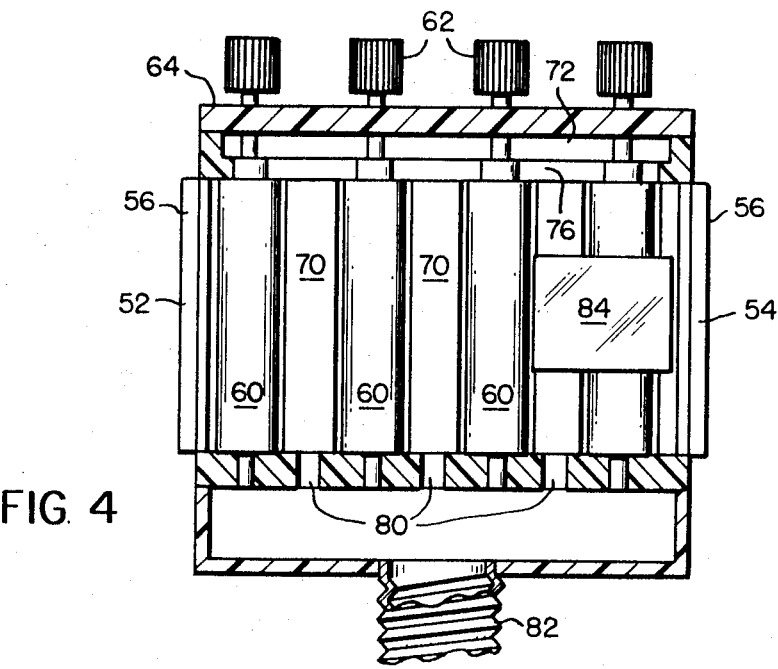
FIG. 4 is a vertical section taken along lines 4—4 of FIG. 2.

The construction of a typical module is shown in FIGS. 2–4. Referring to these figures, a typical module includes a housing 46 having end walls 48 and 50. End wall 48 is provided with a vertical film entrance slot 52 and end wall 50 is provided with a vertical film exit slot 54. It should be appreciated that when several modules are arranged in series, the entrance slot of one will be in line with the exit of the preceding module. Any suitable guide means such as is illustrated at 56 may be used to insure the passage from one module to another of the sensitized material being processed and in addition transfer drive rollers 58 (FIG. 3) may be provided to insure passage of the film from one module to another.

Within each module and spaced along its length is a series of parallel vertically positioned driving rollers 60 (FIGS. 3 and 4) preferably made of a wettable material such as phenolic. The upper end 62 of the driving rollers extend through the top 64 of the module in order to engage any suitable driving means such as a timing belt 66 which passes between the rollers. Any suitable drive motor, not shown, may be used to drive belt 66 through a system of drive and idler pulleys, also not shown.

Figure 6:
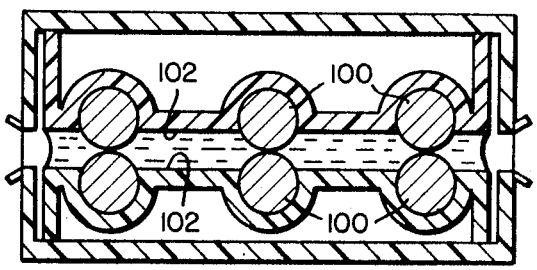
Figure 7:
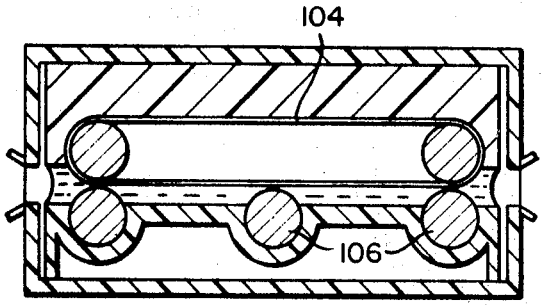

Also arranged within each module along the path of travel of the material being processed are vertically oriented members 68. The surface 70 of these members adjacent the path of travel of the film is preferably made of a wettable material such as fabric, felt, foam or bristles. The particular arrangement of rollers and upright members of the embodiment shown in FIGS. 3 and 4 are staggered such that a roller on one side of the path of travel of the film is located opposite an upright member located on the other side of the path of travel of the film. FIGS. 6 and 7 illustrate other arrangements which shall be described hereinbelow.

Incorporated into module top 64 is a fluid distributor chamber or plenum 72. The chamber includes a fluid entrance port 74 and an elongated fluid exit slot 76, the slot being arranged so that fluid flows from chamber 72 down between the wettable surfaces 70 of members 68. The appropriate fluid such as the developer solution is supplied to the chamber through a conduit 78 (FIG. 2) attached to and extending between the discharge side of pump 20 and port 74. The bottom of the module may be open or may be provided with any suitable drainage openings 80 (FIG. 4) for purposes of draining fluid from the module through a drain line 82 back to the reservoir 22.

The most important feature of the embodiment illustrated in FIGS. 3 and 4 is that the film entrance slot 52 and film exit slot 54 are not sealed to prevent leakage of the developing solution from the module and in fact, no seals are required. In this respect, FIG. 3 shows that the disposition of the upright members 68 and rollers 60 on either side of the path of travel of the film 84 defines a chamber 86 with the ends of the chamber being open to the film entrance slot 52 and film exit slot 54. The fluid flowing downwardly through the module substantially fills this chamber but does not leak through the unsealed film entrance slot 52 and exit slot 54. Such leakage does not occur because the wettable surfaces 70 provided on the upright member 68 and the wettable surfaces of rollers 60 permit the fluid flowing downwardly through the module to wet and cling to the wetted surfaces so as to bridge or span the space therebetween. The wettable surfaces are sufficiently close so that the attraction of the wetted surface for the fluid prevents the fluid from running out of the open film entrance and film exit slots. However, the space across the film path of travel between the upright members 68 is great enough to prevent the film from contacting the surfaces 70 as the rollers transport the film through the module. With this arrangement then, the film is transported through a stream of downwardly moving solution and does not contact or slide across the surfaces 70 of upright members 68. Since the moving film contacts only the rotating drive rollers, the risk of scratching the film by moving it across a fixed surface is eliminated and the flowing stream of solution contacts both surfaces of the film.

Arranged behind each roller member 60 is a roller brush 88 (FIG. 3) which functions to clean the rollers should any byproducts of the chemical reaction and/or emulsion particles tend to accumulate on the roller surface. An alternate arrangement shown in FIG. 5 has the upright members 68' molded moded in an integral piece having flutes 90 through which rollers 60' are rotated.

The module used in the dryer stages is of similar construction to the modules described above but does not require any connections for the circulation of a liquid. In addition, the drive rollers in the dryer may be faced or consist of a moisture absorbing material to assist in drying the film. In the dryer stage, the heated air is simply blown through the dryer module and is then exhausted to the exterior of the machine.

OPERATION

In operation and with reservoir chambers 22, 34 and 44 filled with the appropriate fluid, the machine may be turned on to initiate the action of recirculating pumps 20, 32 and 42 and to actuate the heater and blower of the dryer stage. Turning the machine on also starts the drive motor (not shown) which drives belt 66 to rotate the transfer rollers 58 and driving rollers 60. Initially, the developer, fixer and water will be at room temperature if the machine has been idle for some time. The preferred temperature for the developer solution however is generally above room temperature. Accordingly, the heat exchanger 24 through which the developer solution is circulated has means for indicating the temperature of the solution so that the heat exchanger may heat or cool the solution as necessary to provide the preferred temperature. When the developer solution has reached operating temperature, any suitable indicating means such as a signal light indicates that the machine is ready to receive the film for processing.

Typically the recirculation of the appropriate fluid through each module may be illustrated by reference to FIGS. 2-4. The fluid is pumped through conduit 78 through port 74 and into fluid distributor chamber 72. The fluid fills this chamber and then flows through elongated slot 76 and down between the upright members 68 and drive rollers 60 arranged on each side of the path of travel of the film. Rollers 60 and wettable surfaces 70 of members 68 are spaced such that the fluid wets each roller and wettable surface. This wetting action acts to confine the fluid to a stream within the module which fills the chamber 86 through which the film passes and prevents the fluid from flowing out of the open film entrance and exit slots 52 and 54 respectively.

The exposed film is inserted vertically between the film entrance guide member 56 so that the film passes through the film entrance slot 52 and between the drive rollers 60. Preferably, a daylight loading box (not shown) would be mounted to the cabinet adjacent the loading slot so that normal room illumination could be maintained. As an alternative, the processor could be located in a dark room area. As the film passes into the developer module, any suitable detector signals each of the developer and fixer replenishing pumps 26, 36 respectively to begin operation. These pumps then introduce a predetermined measured quantity of fresh solution into the reservoir tanks 22, 34 respectively which raises the level of fluid in these tanks to an overflow condition, the overflow of the developer and fixer solution being discharged into tanks 30 and 40 respectively. In this manner, a portion of fresh solution is periodically added to the reservoir tanks 22 and 34 to maintain the desired level of activity of the solutions in these reservoir tanks.

After passing through the film entrance slot 52, the negative is driven through the developer module by drive rollers 60 and thereafter the film is driven successively through the fixer, washer and dryer modules in a similar manner. The film is frictionally gripped between the rollers and moves with a slight wave or serpentine motion from one roller to another as shown in FIG. 3 but at no time does the film come into contact with the wettable surfaces 70 of upright members 68. Accordingly, the downwardly flowing solution is able to contact both surfaces of the negative during the course of travel through the module and the film is not scratched by sliding it across a fixed surface.

Because of the vertical orientation of the film negative, the negative is transported through a continuously flowing stream of solution flowing downwardly by gravity in the module. This flow automatically removes the reaction retarding by-products of the chemical reaction occurring at the face of the film plus assuring an adequate supply of potent chemical to the entire film surface.

When the film has been transported through the complete path of travel within the developer stage, it passes out exit slot 54 and enters a corresponding entry slot of the fixer module. There, the process is completed in identical fashion with the film being transported through the downwardly flowing stream of fixer solution and the solution contacting both faces of the film.

Following the fixer stage, the film enters the washer module where it is rinsed with water according to the same technique.

The film ultimately enters the drying module where any rinse water clinging to the film is removed by the warm air blowing through the module. To assist in the drying action, the rollers within the drying module may consist of a hydrophilic material and/or a negative pressure used to assist in removing moisture.

Following the drying stage, the film is passed out of the drying module and into a receiving bin or takeup reel. In the case of processing dental X-ray film, it is contemplated that the whole process from loading to removal of a fully developed and dry film is approximately 2-½ minutes.

The apparatus can be made in a compact self-contained unit so that it can be wall mounted or placed "chair side" on a counter in a dentist's operatory needing only to be connected to a normal electrical outlet. No connection to a water source or drain are required.

Maintenance is minimized in this unique device. Daily cleaning of rollers is eliminated because they are not submerged in solution and subject to sludge formation. Neither are they exposed to any substantial amount of crystallization due to evaporation of solution. The wash water reservoir 42 should be emptied and refilled periodically to prevent excessive accumulation of the fixer solution which may be carried over into the washer module. The replenishing tanks 28 and 38 are filled periodically and the waste tanks 30 and 40 emptied periodically. Any suitable indicator such as a liquid level sensor may be used to notify the operator when the tanks should be filled or emptied.

Figure 5:
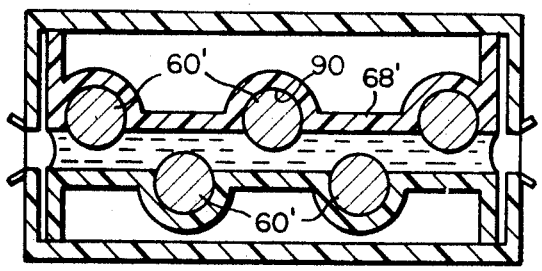
FIG. 5 is a horizontal sectional view taken along line 5—5 of FIG. 2 showing another embodiment of the invention.

The arrangement of drive rollers 60 and wettable surfaces 70 need not be disposed in the staggard arrangement shown in FIGS. 3-5. In this respect, the embodiment shown in FIG. 6 has the drive rollers 100 and wettable surfaces 102 disposed in opposed pairs so that the sensitized material passes through without a wave like motion. This embodiment may be used, for example, in the processing of stiff or rigid sensitized materials such as glass plate.

Any type of film can be processed by this device whether photographic or X-ray, roll or sheet. Where a single emulsion film is used (such as photographic film) various solutions need not contact both sides of the film. For example, the drive mechanism of the invention can be modified as shown in FIG. 7 where in an endless belt 104 which forms one of the opposing surfaces and rollers 106 are used to engage and transport the sensitized material.

Figure 9:
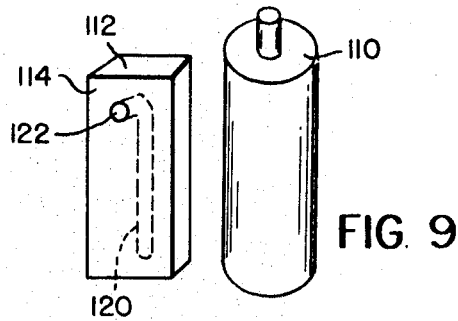
FIG. 9 is a view showing in perspective a portion of the embodiment shown in FIG. 8.

In cases where scratching of the sensitized material is not critical an embodiment as shown in FIGS. 8 and 9 may be used to contact the sensitized material with an appropriate solution. Here the vertically positioned driving rollers 110 spaced along the length of the module are positioned directly opposite an applicator 112. The applicators may be formed of any suitable material with the inwardly directed face 114 being covered with soft bristles 116 which bridge the gap between the applicators and rollers. On the opposite or rear side of each roller is a roller brush 118 provided with bristles which function to assure that the roller will remain free of any crystal or sludge deposits.

Rather than introduce the appropriate solution at the top of the chamber through slot 76, as shown in FIG. 3, an arrangement as shown in FIGS. 8 and 9 may be used wherein each of the upright members has a central vertical feed channel 120 (FIG. 9) passing upwardly therethrough and terminating near its upper end in a dribble port 122 directed horizontally towards the film path. With this arrangement, the solution flows from the dribble port in each of the applicators and bridges across the applicator bristles between each applicator roller pair thus wetting the full height of both the rollers and the applicators. The solution cascades down the face of the applicator from port 122 and drains from the bottom of the module in a manner described herein above. The sensitized material being oriented vertically passes through this bridge of solution and both sides of the sensitized material are thus uniformly and completely wetted by the solution.

Because of the vertical orientation, the solution continuously flows downward by gravity along both faces of the sensitized material. This flow automatically removes the reaction-retarding by-products of the chemical reaction occurring at the face of the sensitized material, thus assuring an adequate supply of potent chemical to the entire sensitized surface. This constant movement of solution in contact with the sensitized material is enhanced by the wiping action of the soft applicator bristles and by the rollers which squeeze or roll back the fluid.

Thus, it will be appreciated that the present invention accomplishes its intended objects in providing an improved method and apparatus for processing sensitized material such as X-ray film and the like wherein the processing is accomplished in a self contained unit which can be operated by unskilled help and which needs no connections to existing water supply or drain lines. The invention permits processing by passing the vertically oriented sensitized material into and through a chamber filled with a downwardly flowing stream of the processing solution wherein leakage of the fluid from the entrance and exit for the sensitized material is prevented without the need of seals at these points.

Having thus described the invention in detail, what is claimed as new is:

1. Apparatus for processing exposed sensitized material by transporting the same through a processing chamber in which said material is in contact with a fluid to reveal the latent images thereon, said apparatus comprising:
   a. upright members arranged in two substantially parallel rows which define a path of travel for said sensitized material;
   b. drive means along said path of travel for engaging and moving said sensitized material;
   c. said upright members and drive means together defining adjacent opposed surfaces of said processing chamber, one of said surfaces being on each side of said path of travel, the bottom of said chamber between said surfaces having an open drain and opposite ends of said chamber having a vertical entrance and exit slot respectively extending substantially the full height of said chamber;
   d. means for continuously introducing fluid into the upper regions of said chamber along substantially its full horizontal length, said fluid flowing by gravity in said chamber between said adjacent surfaces and out the open drain of said chamber; and
   e. said adjacent surfaces being disposed so that fluid flowing down through said chamber spans the spaces between adjacent ones of said upright members and said drive means and substantially fills said chamber, whereby sensitized material is immersed in said downward flow while moving through said path of travel from said entrance slot to said exit slot in said chamber.

2. Apparatus as set forth in claim 1, including a top member for said chamber on the upper ends of said upright members, said top member having an opening into the upper regions of said chamber which extends substantially the full horizontal length of said chamber for discharging fluid into said chamber.

3. Apparatus as set forth in claim 2 wherein said top member encloses a plenum which communicates with said fluid opening, and a fluid inlet which extends through said top and communicates with said plenum; and pump means having its discharge side connected to said fluid inlet and its intake side communicating with the open drain of said chamber for recirculating of processing fluid through said chamber.

4. Apparatus as set forth in claim 1, wherein one row of upright members is an endless belt which comprises said drive means.

5. Apparatus as set forth in claim 1, wherein said drive means comprises upright rollers, the upper portion of said rollers extending through said top member; and means engaging the upper portion of said rollers for driving the same in unison.

6. Apparatus for processing exposed latent images on sensitized material, by contacting said material with a fluid to reveal the latent images thereon while moving said material through a path of travel, said apparatus comprising:
   a. a plurality of spaced substantially upright wall members arranged in two substantially parallel rows, said path of travel being between said rows wherein said sensitized material is oriented in a vertical plane as it passes between said upright wall members;
   b. upright drive rollers arranged among said wall members and along said path of travel for engaging and moving said sensitized material through said path of travel;
   c. said two rows of upright wall members and said drive rollers together defining opposite adjacent upright surfaces of a processing chamber, the bottom of said chamber having an open drain and the opposite ends of said chamber having vertical entrance and exit slots respectively for said sensitized material;
   d. a top member for said chamber, said top member enclosing a plenum and having a fluid inlet communicating through said top member with said plenum and a fluid outlet communicating with and extending between said plenum and the upper regions of said chamber, the communication of said outlet with said chamber extending along substantially the full horizontal length of said chamber;
   e. pump means for continuously recirculating fluid from said open drain to said plenum inlet, said fluid flowing by gravity from said plenum outlet, and down through said chamber along substantially the entire horizontal length of said chamber; and
   f. said upright wall members and rollers being constructed and arranged so that said fluid passing down through said chamber spans the spaces between adjacent ones of said upright members and rollers to maintain said chamber substantially completely filled with fluid while said pump is operating, whereby sensitized material while passing through said chamber is completely immersed in a fluid flow.

7. Apparatus as set forth in claim 6 wherein said upright members and rollers are staggered along said path of travel so that one of said rollers on one side of said path of travel is disposed opposite an upright member on the other side of said path of travel.

8. Apparatus as set forth in claim 6 wherein said upright drive rollers each have a portion extending up through said top member; and drive means engaging said portion for driving said rollers.

9. Apparatus as set forth in claim 6 comprising:
   a. a plurality of said chambers aligned and spaced end to end, wherein the exit slot of one chamber is aligned with and spaced from the entrance slot of another; and
   b. means for directing an appropriate fluid to each of said chambers.

10. Apparatus as set forth in claim 9, wherein the ends of said chambers are defined by a pair of upright, opposed drive rollers for engaging and moving said sensitized material from the exit of one chamber to the entrance of the next in line chamber.

11. Apparatus as set forth in claim 6 wherein said upright members are formed integral a unitary wall structure with the spaces between adjacent upright members being formed by fluted portions in said wall structure and said drive rollers being arranged in said fluted portions.

12. Apparatus as set forth in claim 6 wherein said upright wall members depend from the underside of said top member and said fluid outlet opens directly into the top of said chamber between said wall members.

13. Apparatus as set forth in claim 12 wherein said fluid outlet is a slot having a length and width substantially equal to the horizontal cross-sectional length and width of said chamber.

14. In an automatic film developer wherein the film is automatically conveyed through the conventional processing stages of developing, fixing, washing and drying, the improved means for assuring complete and even film development which comprises:
   a. a series of three substantially identical film processing modules arranged to sequentially receive and perform the developing, fixing and washing steps, respectively, on a film negative passing therethrough;
   b. each of said modules comprising a series of parallel, spaced film-driving rollers, each arranged to rotate about a vertical axis and so spaced from each other to define a vertical serpentine path of film movement therethrough;
   c. each of said modules further comprising a series of substantially identical vertical fluid applicators interspersed among said rollers and along said serpentine path to form a series of opposed pairs of rollers and applicators positioned on opposite sides of said serpentine film negative path, said applicators being so shaped and arranged as to contact the full vertical height of a film passing therethrough, and the gap between each roller-applicator pair being substantially bridged by a series of soft bristles extending from said applicator contact surface;

d. each of said modules further comprising means for causing an appropriate chemical solution to flow downwardly by gravity along the contact surface of said applicators to wet the full height of said contact surface, and means for causing the by-products of chemical reaction to be continuously drained away by gravity from the film negative;

e. means for rotatably driving said drive rollers to transport a film through the successive modules; and f. means for circulating chemical solutions to and from each of said modules.

15. The film developer of claim 14 wherein each of said fluid applicators has a central vertical bore for conveying chemical solution upwardly to a dribble port located at the top of the applicator from which port the solution can cascade downwardly along said bristled contact surface.

* * * * *